Nov. 24, 1964  P. MARATUECH ETAL  3,158,782
MEANS FOR ELIMINATING STATIC CHARGES FROM VEHICLES
Filed Nov. 1, 1960

Paul Maratuech
René Bernada
Inventors

By Felix A. Russell
Attorney

000
United States Patent Office 3,158,782
Patented Nov. 24, 1964

3,158,782
MEANS FOR ELIMINATING STATIC CHARGES FROM VEHICLES
Paul Maratuech, La Garenne-Colombes, and René Bernada, Paris, France, assignors, by mesne assignments, to Inventions Finance Corporation, New York, N.Y., a corporation of Delaware
Filed Nov. 1, 1960, Ser. No. 66,623
Claims priority, application France Nov. 16, 1959
10 Claims. (Cl. 317—2)

This invention relates to systems for removing static electric charges built up in ground vehicles, and more especially vehicles provided with tires.

It is now recognized that vehicles supported on tires tend to become charged with static electricity primarily through friction of the tires against the surrounding dry air, and the built-up charge may cause disagreeable or dangerous shocks to persons, as when opening or closing a door of the vehicle. Heretofore, for removing the static charges it has been customary to provide chains trailing from the rear of the vehicle. Such a chain will remove the static charge as it touches the ground surface, and while the expedient has been reasonably successful when used on trucks and the like, results have been much less satisfactory with passenger cars.

Broadly, this invention provides improved means for removing static charges from a vehicle, which in place of the customary trailing chain utilizes an electrically conductive point or needle inserted in at least one of the tires of the vehicle, so as electrically to ground the vehicle body at each turn of the wheel. Such a device is fully concealed, will not be apt to depart from its correct operating position, and will wear at the same rate as the tire in which it is inserted.

Objects, therefore, of the invention, include:

The provision of means of removing static charges from vehicles that will be invisible, inexpensive and long-lived, and including electrically conductive means mounted on the inner face side of a tire of the vehicle so as to place the rim of a related wheel of the vehicle in electrical communication with the ground.

To provide static charge-eliminating means including at least one conductive means placing the flange of a rim of at least one of the vehicle wheels into electrical contact with at least one metal rod extending through the tire tread and adapted to engage the ground surface as the vehicle advances.

To provide such static charge-eliminating means wherein each conductive means comprises a flexible conductive strip having a small-diameter sharp-tipped, metal rod connected with a midpoint thereof, the ends of the strip being inserted between the wheel rim and the tire beads so that said strip will be partially applied against the inner face of the tire tread and the metal point or rod will project through the tire tread.

To provide such a static-eliminating device wherein the metal strip is so conformed as to enable its being readily fitted to a variety of tire configurations.

To provide static eliminating means for vehicles, wherein each conductive means comprises a strip of flexible extensible material having at least one of its sides coated with a composition having good electrical conductivity, which strip is provided with a metal rod secured to a supporting plate connected with the coated side of the strip.

The above and further objects, features and advantages of the invention will become apparent as the disclosure proceeds with reference to the accompanying drawings, wherein an exemplary embodiment of the invention is shown for purposes of illustration but not of limitation.

Figure 1:
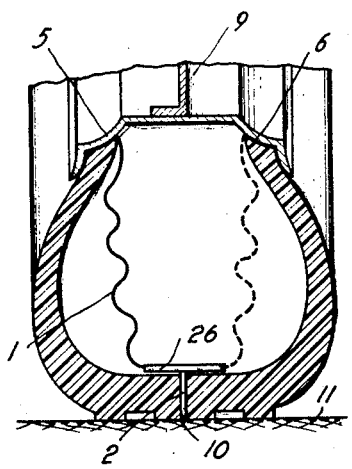
FIG. 1 illustrates a form of the invention in section.

Referring to the drawings, in one construction static charge removing means according to the invention comprise a flexible electrically conductive strip 1 (FIG. 1), e.g. woven metal braid or metal-coated fabric or the like, of appropriate length, having attached to a midpoint thereof, as by solder or otherwise, one or more metallic rods 2 of small diameter, and formed with a relatively sharp tip. The strip 1 is preferably covered with a protective sheath, e.g. rubber or plastic, except near the opposite ends 5 and 6 of the strip.

The assembly thus described is inserted within a selected one of the vehicle tires with the metal rod 2 being inserted in the tire tread portion of tire casing 7 so that it extends throughout the depth of the tire tread and protrudes sligly beyond, as shown. The strip is held in contact with the inner face of the tire tread and the metal rod or "needle" 2 is retained in said tire tread by means of a patch 26 of flexible material adhesively bonded to said inner face. An adhesive bond may be provided exclusively between the said patch and the tire, or additionally on all or part of the strip connecting the patch with the rim of the wheel. The latter arrangement is applicable with especial advantage to tires of the type filled with a homogeneous, flexible, solid material rather than merely inflated with air.

The ends 5 and 6 of the metal strip are clamped between the tire beads and the flanges of the metal wheel rim 9, thereby providing an electrical connection between the vehicle body and the ground.

It is understood that the protruding part of the metal rod when in position is cut off substantially flush with the outer surface of the tire.

It will readily be appreciated that with the arrangement disclosed, at each revolution of the wheel the end 10 of the metal rod engages the ground surface 11, thereby discharging any static electricity present in the vehicle body to the ground.

Various modifications may be introduced into the structure described so far, within the scope of the invention. Thus, in the case of air-inflated tires, the electrically conductive strip may be reduced to a single length rather than the two shown in FIG. 1, and may be attached to the inflating valve by any appropriate means.

Figure 3:
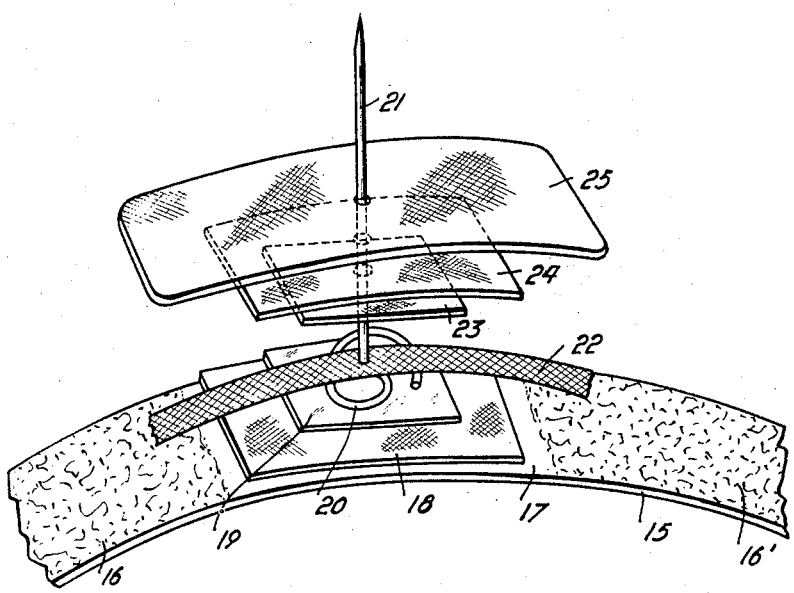
FIG. 3 is a detail exploded view showing a specific construction applicable to FIG. 2, but also applicable to the embodiment of FIG. 1, when inverted.

The conductive strip may comprise wire braid, or wire or cable of any desired configuration, e.g. zigzag or accordion-pleated. Alternatively the strip may be a band of flexible material e.g. rubber or plastic, coated with a conductive composition such as graphite or metal, e.g. sprayed thereon. Where the conductive strip comprises a coated band as just described, the coated side of the strip should be arranged to be the side contacting the wheel rim. The strip may be metal-coated only in a central portion thereof, in which case the rod 2 would be provided with a base for retaining a metal braid engaging the metal-coated surfaces on each side. The rod and the braid may be held in position by means of a pair of metal plates bonded, e.g. welded, together, and the resulting assembly in turn together with the metal strip being secured to the internal face of the tire tread by means of a patch as shown in FIG. 1. It will be apparent that in the case of an air inflated tire, the adhesive bond should be very thoroughly made. It may be noted at this point that the construction shown in FIG. 3 and later described in detail can be used in the embodiment last described, provided simply the metallic rod shown in FIG. 3 is inverted.

The conductive coating, such as graphite, may be applied by spraying or brush-coating. The surface of the strip which is to receive the coating composition should first be coated with a rubber solution. Graphite, in fine powder form, may also be applied by solvent coating from an appropriate solvent such as trichloroethylene.

Various other modifications may be made in the shape and manner of assembly of the components described. Thus, the metal rod and the related conductors may be imbedded in a moulding of yielding material to provide a flexibly deformable unit. The strip may comprise a rubber or analogous compound with graphite or metal powder mixed therein.

Rather than a strip, a simple wire may be used, such wire having one end connected to the base of the metal rod suitably retained in a patch of flexible material capable of being adhesively bonded. The flexible wire would then be connected with a metal washer which may for example be inserted between the insulating valve and the wheel rim.

Figure 2:
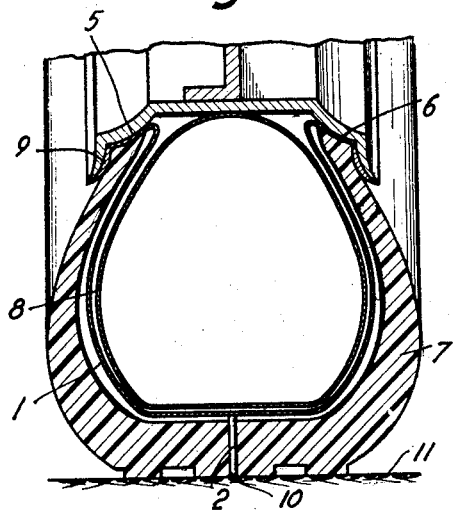
FIG. 2 illustrates a modification especially applicable to tires of the type including an inner tube.

FIG. 2 illustrates a modified embodiment especially applicable to tires of the type including an inner tube. The metal strip 1 is in this case carefully applied to the inner surface of the casing 7 so as to conform narrowly to the contour of inner tube 8 and not to interfere with the proper behavior thereof in service. The ends 5 and 6 of the strip are normally maintained in contact with wheel rim 9 after inflation of the inner tube. The rod 2 is firmly attached to the strip through any suitable means. At each wheel revolution the tip 10 of the rod or needle will engage the ground surface 11 discharging any static electricity.

As shown in FIG. 3, the system of the invention may comprise a flexible strip 15 of rubber or any other suitable material, of sufficient length to surround the inner tube completely and engage with the metal wheel rim. This construction shown in FIG. 3 is in principle applicable also to tire constructions of the tubeless type. In such case, only the position of the needle or rod would be inverted, as previously noted hereinabove. The strip is coated on its upper surface and to either side from its midpoint with a coating of graphite or metal, as shown at 16 and 16', a separation 17 being provided for the adhesive bonding thereto of a patch of reinforcing rubberized fabric or the like, as shown at 18. This fabric element is disposed upon a metal plate 19 on which the spiral-shaped base 20 which is provided at the end of rod 21 is positioned.

Positioned on the base 20 and threaded around the rod 21 is a conductive braid 22 of appropriate length such that its ends protrude beyond the sides of the reinforcing fabric 18 and will engage with the conductive-coated surfaces 16 and 16'. Also threaded on rod 21 is a further metal plate 23 soldered at its periphery to the first plate 19, and thereover is positioned a reinforcing rubberized fabric element 24, followed by a patch 25 of adhesively bondable material, bonded to the strip 15 so as to clamp and retain all of the afore-mentioned components and provide the desired tight seal as required in a tubeless tire.

It will be appreciated that owing to the elasticity of the strip 15 said strip will, when mounted in a tire having an inner tube, conform accurately to the shape of the tube, and even though it is positioned between the tube and the tire casing, and in the recessed part of the wheel rim, an electric connection will be provided from the vehicle body to the rod without there being any danger of the strip slipping, and hence without any objectionable heating of the inner tube when the vehicle is running at high speed.

Moreover, owing to the flexible base of the rod 21, which preferably is not welded or soldered to the metal plate 22 and 23, said rod will withstand any torsional stresses which may arise from road bumps and when steering round bends.

The surface areas coated with conductive composition, such as graphite or metal, will at all times provide high conductivity regardless of the continual deformations which the strip may have to withstand together with the tire in operation of the vehicle. It should be noted that the use of a conductive coating composition such as graphite or spray-coated metal will substantially reduce the weight of the attachment.

Although certain specific embodiments of the invention have been shown and described, it is obvious that many further modifications thereof are possible. Thus the metal rod may assume the form of a nail having a flat head of substantial size at one end, or two such metal rods, needles or nails may be used, the one positioned outside and the other within the tire. The strip used may be metallic, it may be folded or pleated or it may include a number of telescoped portions. The wire may consist of an extensible braid or it may have any desired cross section. All dimensions, configurations and other features are susceptible of variation depending on the particular application. The static-eliminating attachment of the invention is applicable to passenger cars, trucks, motor-bicycles, bicycles, and broadly to any vehicles provided with tires.

What I claim is:

1. In combination with a primary supporting roadway vehicle wheel of the type comprising a central hub member with tire engaging side rims and a tire carried by said hub and having a tread portion and spaced side wall portions extending inwardly thereof and terminating in beads engaging said rim whereby to define an enclosed cavity between said tread portion, said spaced sidewall portions and said hub: an static removal means comprising a conductive element extending from said cavity through said tread portion for engagement with a roadway, and conducting means within said cavity for electrically connecting said conductive element with said hub.

2. The combination defined in claim 1, wherein said conductive means is in contact with the wheel rim and wherein said conductive element comprises at least one metal rod.

3. The combination defined in claim 1 wherein said conducting means comprises a flexible at least partly-metallic strip, wherein said conductive element comprises a small-diameter pointed metal rod attached to said strip intermediate its length, and when said strip is inserted between said side rims and said beads.

4. The combination defined in claim 3, wherein said strip comprises wire braid.

5. The combination defined in claim 3, wherein said strip comprises wire.

6. The combination defined in claim 1 wherein said conducting means comprises a strip of flexible extensible material, an electrically conductive coating on at least one side of said strip, a metal supporting member connected with said coated side of the strip, and wherein said conductive element comprises a metal rod attached to said member.

7. The combination defined in claim 6, wherein said strip is coated with graphite.

8. The combination defined in claim 6, wherein said strip is coated with metal.

9. The combination defined in claim 6, wherein said strip of flexible extensible material is coated with said conductive composition on opposite sides of a central area thereof, wherein said metal supporting member is secured to said area, and wherein said static removal means comprises a metallic strip providing electrical connection between said strip of coated flexible material and said metal supporting plate.

10. The combination defined in claim 1 wherein said conductive element is elastically connected with said conducting means.

References Cited in the file of this patent

UNITED STATES PATENTS

| | | |
|---|---|---|
| 2,329,332 | Bull | Sept. 14, 1943 |
| 2,521,305 | Olson | Sept. 5, 1950 |
| 2,524,163 | Criss | Oct. 3, 1950 |
| 2,945,988 | Henry | July 19, 1960 |